United States Patent [19]

Selder

[11] 4,387,856
[45] Jun. 14, 1983

[54] METHOD FOR OPERATING AN INSTALLATION FOR PROCESSING WASTE PAPER

[75] Inventor: Harald Selder, Schlier, Fed. Rep. of Germany

[73] Assignee: Escher Wyss GmbH, Ravensburg, Fed. Rep. of Germany

[21] Appl. No.: 183,086

[22] Filed: Sep. 2, 1980

[30] Foreign Application Priority Data

Oct. 10, 1979 [CH] Switzerland .................... 9135/79

[51] Int. Cl.³ ........................................... B02C 23/38
[52] U.S. Cl. ...................................... 241/28; 241/35; 241/46.17
[58] Field of Search ................... 241/28, 30, 33, 35, 241/46.17

[56] References Cited

U.S. PATENT DOCUMENTS

| | | | |
|---|---|---|---|
| 2,843,327 | 7/1958 | Nickle | 241/35 |
| 3,942,728 | 3/1976 | Christ et al. | 241/46.17 |
| 3,995,817 | 12/1976 | Brociner | 241/30 |
| 4,017,033 | 4/1977 | Tra | 241/46.17 |
| 4,076,178 | 2/1978 | Haude | 241/33 |

Primary Examiner—James G. Smith
Assistant Examiner—K. Bradford Adolphson
Attorney, Agent, or Firm—Werner W. Kleeman

[57] ABSTRACT

At a fiberizer of a waste paper processing installation the rotational moment or torque is determined, for instance by measuring the drive output of a drive motor. In the presence of an increase of the rotational resistance of the rotor of the fiberizer there is brought about an intensification of the separation of rejects through a reject line and vice versa. For this purpose there are arranged in either the reject line or the good stock line, or at the same time in both such lines, throttle elements which are activated by a regulator. The regulator is controlled by a measuring signal of a measuring device which determines the electrical drive output of the rotor.

4 Claims, 3 Drawing Figures

METHOD FOR OPERATING AN INSTALLATION FOR PROCESSING WASTE PAPER

BACKGROUND OF THE INVENTION

The present invention relates to a new and improved method of operating an installation for processing waste paper.

Generally speaking, the waste paper processing installation operated according to the method of the invention contains a stock slusher or pulper and a device containing a housing which is arranged following the pulper with respect to the flow direction of the stock suspension. Within the housing there is arranged a closed defibering compartment or chamber, a rotor driven by a motor as well as a sieve or filter, at which merges a good stock chamber or compartment from which leads to the outside a good stock line or conduit. Additionally, there is provided at least one reject line leading from the defibering chamber towards the outside and serving for the elimination or separation of contaminants.

Waste paper processing installations of this type are known, for instance, from German Pat. No. 2,721,882, granted Jan. 18, 1979 and German Pat. No. 2,757,580, granted Mar. 15, 1979. The apparatus which is connected following the stock pulper, which is usually referred to in the art as a secondary pulper or fiberizer, is known for instance from U.S. Pat. No. 3,942,728, granted Mar. 9, 1976 and the corresponding German Pat. No. 2,345,735, granted Nov. 25, 1976.

Heretofore with the prior art installations the quantity of suspension which was separated out as a function of time was maintained constant, so that there was provided either a uniform flow through the reject line, or uniform periodic opening of a valve arranged in the reject line. The separation of the suspension charged with contaminants was accomplished independent of the content of contaminants, such as, for instance, foil pieces, pieces of solid wet paper which were not completely defiberized, or also heavy contaminants or particles and so forth.

Since these contaminants are present irregularly in processed waste paper, it was necessary to select the intensity of the separation operation, i.e. the quantity of suspension removed per unit of time, to be so great that there need not be feared any clogging of the apparatus, even in the presence of a maximum amount of contaminants which could be expected. This of course resulted in appreciable losses in energy and also good stock, since in the normal case it was necessary to remove too great a quantity of good stock along with the contaminants, of which only a part could be reclaimed.

SUMMARY OF THE INVENTION

Therefore, with the foregoing in mind it is a primary object of the present invention to provide a new and improved method of processing waste paper in a manner not associated with the aforementioned drawbacks and limitations of the prior art proposals.

Another and more specific object of the present invention aims at providing a new and improved waste paper processing method wherein it is possible to accommodate in a much better manner than heretofore possible the elimination of the suspension through the reject line based upon the actual presence of contaminants, and specifically both the heavy rejects as well as light rejects.

Now in order to implement these and still further objects of the invention, which will become more readily apparent as the description proceeds, the method of the present development is manifested by the features that the torque or rotational moment of the rotor of the fiberizer is determined, and the elimination of the suspension through the reject line is governed as a function of the torque or rotational moment of the rotor in a manner such that upon increase of the torque of the rotor there is carried out an intensification of the separation through the reject line and vice versa.

As already alluded to above the invention is not only concerned with the aforementioned method aspects, but also relates to an installation or apparatus for the performance thereof, which is manifested by the features that the rotor is provided with a measuring device for determining the torque of the rotor. The measuring device produces an appropriate measuring signal which is infed to a regulator. The good stock line and/or the reject line is provided with a throttle element which is controlled by the regulator. The throttle element serves to adjust the quantity of suspension which is eliminated through the reject line as a function of the momentary rotational moment or torque of the rotor, and specifically, in a manner such that in the presence of an increased rotational moment there is an intensification of the separation through the reject line and vice versa.

It has been found that the resistance of the suspension located in the defiberizing chamber, opposing a rotation of the rotor, and thus, the rotational moment which must be applied by the rotor, increases with increasing content of such type light contaminants. Therefore, the rotational moment appearing at the rotor at a certain rotational speed can be used as a guide for the content of the light contaminants of the suspension located in the equipment. Thus, it is possible to positively carry out the separation or elimination through the reject line when the content of contaminants increases. On the other hand, with low content of contaminants or in the absence of light contaminants there is possible a pronounced reduction of the elimination through the reject line, affording a decisive saving in energy and a reduction of the loss of the fiber material which is associated with every separation or elimination operation. Additionally, subsequently arranged sorting machines used for the processing of the separated rejects are thus relieved of unnecessary work.

Preferably, the drive motor of the rotor can possess an essentially constant rotational speed, and there is used for the determination of the rotational moment of the rotor the momentary output of the drive motor.

The throttle element can be arranged in the good stock line, and the regulation device or regulator can cause actuation of the throttle element in the sense of closing the same in the presence of increasing rotational moment or torque.

However, the throttle element also can be connected in the reject line, so that its actuation by the regulation device or regulator is accomplished in the sense of opening such throttle element in the presence of increasing rotational moment of the rotor.

It should be understood that also both of the throttle elements can be simultaneously provided. In such case they can be actuated to operate in opposite sense.

The change of the quantity flowing through the reject line can be accomplished continuously. However, it is also possible to undertake opening and closing of the throttle element discontinuously at spaced intervals in the sense of on-off regulation, wherein the regulation device influences the duration and/or the frequency of the time intervals of the open position and closed position of the throttle element.

As already mentioned, the drive motor can have an essentially constant rotational speed and in order to determine the rotational moment there can be provided a suitable measuring element connected in the power supply line of the drive motor and which measuring element serves for determining the electrical output of the drive motor.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
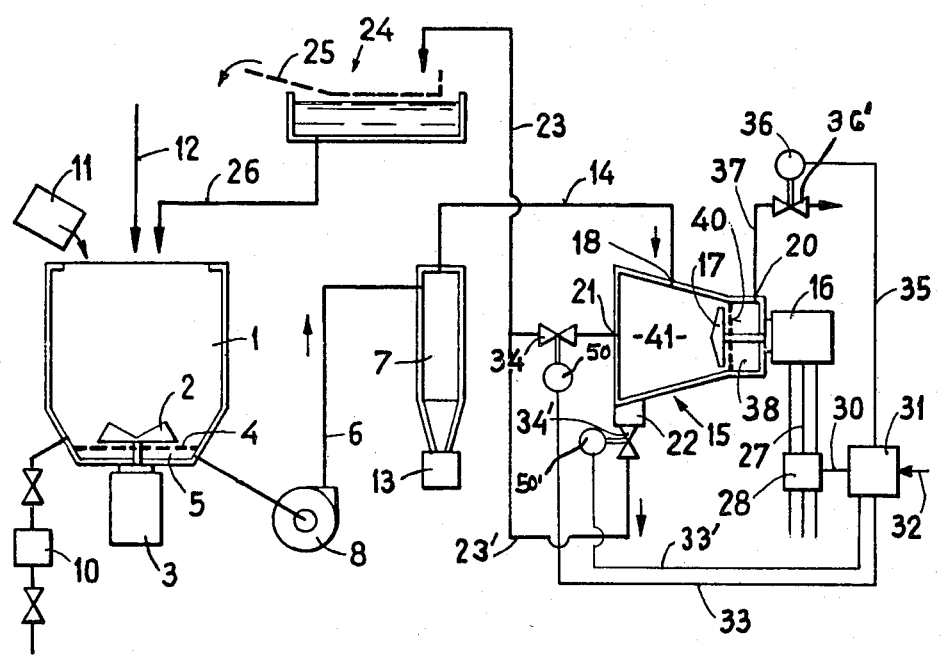
FIG. 1 is a schematic diagram of an installation for processing waste paper according to the invention.

Describing now the drawings, the exemplary illustrated embodiment of apparatus or installation for processing waste paper will be seen to contain a conventional stock slusher or pulper 1 equipped with a rotor 2 having a vertical shaft, this rotor 2 being driven by a suitable drive motor 3. Below the rotor 2 there is located a perforated plate or sieve 4 which bounds a space or chamber 5 for the withdrawal of good stock. Leading from this space or chamber 5 is a connection line 6 to a separation device or separator 7 which serves to separate out heavy contaminants or rejects. A pump 8 is located in the connection line or conduit 6 and serves to convey the defibered stock or suspension.

The stock pulper 1 is equipped with a sluice 10 for the removal of the heavy contaminants or rejects which have been separated in the stock pulper or slusher 1. Reference character 11 designates bales of waste paper which are introduced into the stock pulper 1. Additionally, the arrow 12 schematically represents the infeed of water serving for the slushing or defiberizing of the waste paper.

The separation device or separator 7, which can be designed in the manner of a hydrocyclone, has a sluice 13 serving for the removal of the separated heavy contaminants or rejects. As a rule, at this location there are used a battery or array of a number of parallel connected hydrocyclones.

A connection line or conduit 14 leads from the separator device or separator 7 to a fiberizer 15. This fiberizer 15 can be constructed, for instance, according to the teachings of the aforementioned U.S. Pat. No. 3,942,728 and the corresponding German Pat. No. 2,345,735. The fiberizer 15, which contains a rotor 17 driven by a suitable drive motor 16, is provided with an inlet 18 for the stock suspension which is to be processed, an outlet 20 for good stock, an outlet 21 for lightweight substances to be separated, and an outlet 22 for heavy rejects or particles which are to be separated. At the outlets 21 and 22 for the substances which are to be eliminated, i.e. the rejects there merges a reject line or conduit 23 which leads to a dynamic jarrer or vibrator 24 equipped with a movable sieve or screen 25. The fiber-containing liquid or stock suspension which passes through the sieve 25 is returned by a line or conduit 26 back into the stock slusher or pulper 1.

According to the invention, there is connected at the power supply line or network 27 of the drive motor 16 a measuring device 28 for the electrical output which is removed by the drive motor 16, for instance a wattmeter. The measuring signal of the measuring device 28 is delivered by means of a signal line 30 to a regulating device or regulator 31 which compares this measuring signal with a reference value or set signal 32. The regulator 31 is connected by the signal lines 33 and 33' with actuation devices 50 and 50' provided for the throttle elements 34 and 34', for instance valves, respectively, which are located at the outlets 21 and 22 of the fiberizer 15. Additionally, leading from the regulator 31 is a signal line 35 to an actuation device 36 of a further throttle element 36', again in the form of a valve for instance, which is located in the good stock line 37. The good stock line 37 leads from the good stock chamber or compartment 38 of the fiberizer 15 towards the outside for further processing of the good stock and for its use in a suitable papermaking machine. As will be readily evident from FIG. 1, the good stock chamber or compartment 38 is separated by a sieve or screen 40 from the defiberizing chamber 41 of the fiberizer 15. The sieve 40 is arranged such that the arms 17' or equivalent structure of the rotor 17 move along the sieve 40.

Although all of the output lines of the fiberizer 15, namely the reject lines 23 and 23' as well as the good stock line 37, are equipped with throttle elements 34, 34' and 36', as a rule there is only used one such throttle element, preferably the throttle element 36'. A valve arranged in the good stock line 37, in the case the valve 36', is subjected to lesser danger of clogging than a valve located in the reject line.

If there is only provided the valve 36', then the installation of the invention shown and described above with respect to FIG. 1, operates as follows:

The suspension formed in the stock pulper or slusher 1, which is mixed with heavy and light rejects, arrives by means of the pump 8 and the hydrocyclone 7 at the defiberizing or defibering chamber 41 of the fiberizer 15. Under the action of the pump 8 there prevails within the fiberizer 15 an excess pressure. During normal operation the valve 36' is open. The good stock which arrives out of the defiberizing chamber 41 through the sieve 40 at the good stock chamber 38, therefore can flow-off through the good stock line 37 and can be further used. The outlet line 21, where there is absent in this case the valve 34, is dimensioned such that a given proportion of the infed stock suspension flows through such outlet line 21 and reaches the dynamic jarrer or vibrator 24. Since, as illustrated and also apparent from the disclosure of the aforementioned U.S. Pat. No. 3,942,728, the outlet 21 from the vortex core of a rotating flow leads towards the outside, this vortex flow being formed in the defiberizing chamber 41 of the fiberizer 15 under the action of the rotor 17, the flow of the stock suspension reaching the reject line 23, contains the light rejects or contaminants which have collected at the center of the vortex.

Now if the rotational resistance of the rotor 17 increases, which indicates that the proportion of contaminants or rejects in the defiberizing chamber 41 has increased, then the regulator 31 operates the valve 36' in a closing sense. This causes an increase of the pressure within the defiberizing chamber 41 of the fiberizer 15, leading to an increase of the flow through the reject line 23. If conversely the resistance of the rotor 17 again drops, and thus, there also drops the momentary power output of the drive motor 16, then the regulator 31 completely opens the valve 36', so that there is again established the previous conditions.

With a valve 34 arranged in the output line 21 the system operates in the converse manner. If the measuring device 28 indicates an increase of the rotational resistance of the rotor 17, then the regulator 31 activates the valve 34 in the sense of opening the same, so that there can be increased the outflow through the reject line 23.

If both of the valves 34 and 36' are provided, then both operate simultaneously in the described manner.

Under circumstances it is possible to provide, instead of a continuous actuation of the valves 34 and/or 36' a discontinuous actuation of such valve or valves, so that the related valve, in each case, is located in an open or a closed position. The change of the material quantity which is to be eliminated or separated thus can be brought about by the regulator 31 either in that with the same time durations that the valves are opened, there is altered the points in time when such valves are opened, or with the same points in time when the valves are opened there is altered the duration that the valves remain open.

Figure 2:
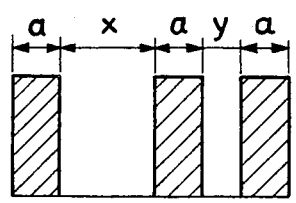
FIGS. 2 and 3 respectively show graphs for different possible techniques of controlling the throttle element.

In FIG. 2 there is illustrated a regulation operation, according to which the related valve always is maintained open during a time span a which is always the same. With small presence of contaminants or rejects the invervals between the times a of opening of the valves becomes greater, and this has been designated by reference character x, whereas with a greater amount of contaminants the time intervals between opening of the valves becomes smaller, as the same has been designated by reference character y in FIG. 2.

Figure 3:
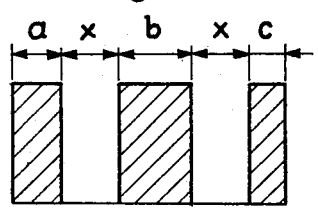

With the regulation technique of FIG. 3 the time spans x between the individual times of opening of the valves are the same, the time duration that the valves are open is however different as such has been indicated by reference characters a, b and c. The longer opening time duration b corresponds to a greater amount of contaminants or rejects (greater rotational resistance of the rotor), the time span c represents the presence of a smaller amount of contaminants or rejects.

The same also is true for the valve 34' at the outlet 22 for the heavier rejects which are to be separated. This valve 34' can be controlled in the same manner as the valve 34 provided at the outlet 21. Under circumstances it is even also possible to dispense with the outlet 21 and only to provide the outlet 22. While the axial outlet 21 only is suitable for the elimination of lightweight particles, the outlet 22 located at the circumference of the fiberizer 15 is suitable for eliminating both heavyweight particles as well as also lightweight particles.

While there are shown and described present preferred embodiments of the invention, it is to be distinctly understood that the invention is not limited thereto, but may be otherwise variously embodied and practiced within the scope of the following claims. Accordingly,

What I claim is:

1. A method of operating an installation for the processing of waste paper comprising the steps of:
    providing a stock pulper and a device arranged after the stock pulper, with respect to the direction of flow of the stock suspension, this device having a housing in which there is arranged a closed defiberizing chamber, a rotor driven by a drive motor and a sieve at which merges a good stock chamber from which there outwardly leads a good stock line, as well as at least one reject line leading towards the outside from the defiberizing chamber for contaminants which are to be separated;
    measuring the rotational moment of the rotor; and
    controlling the separation of the suspension through the reject line as a function of the rotational moment of the rotor such that upon increase of the rotational moment of the rotor there is intensified the separation of the suspension through the reject line and upon decrease of the rotational moment of the rotor there is reduced the separation of the suspension through the reject line.

2. The method as defined in claim 1, further including the steps of:
    driving the rotor at an essentially constant rotational speed; and
    employing for the measurement of the rotational moment of the rotor the momentary output of the drive motor of the rotor.

3. The method as defined in claim 1, further including the steps of:
    decreasing the time intervals between separation of the suspension through the reject line in the presence of a greater amount of contaminants which are to be separated.

4. The method as defined in claim 1, further including the steps of:
    maintaining the separation of the suspension through the reject line effective over a longer time span in the presence of a greater amount of contaminants.

* * * * *